US011933188B2

(12) United States Patent
Campomanes et al.

(10) Patent No.: US 11,933,188 B2
(45) **Date of Patent: *Mar. 19, 2024**

(54) METHOD OF MANUFACTURING GAS TURBINE ENGINE ELEMENT HAVING AT LEAST ONE ELONGATED OPENING

(71) Applicant: PRATT & WHITNEY CANADA CORP., Longueuil (CA)

(72) Inventors: Marc Campomanes, Longueuil (CA); Orlando Scalzo, Montreal (CA); Bruno Chatelois, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 217 days.

This patent is subject to a terminal disclaimer.

(21) Appl. No.: 17/319,578

(22) Filed: May 13, 2021

(65) Prior Publication Data

US 2021/0277797 A1 Sep. 9, 2021

Related U.S. Application Data

(62) Division of application No. 14/338,480, filed on Jul. 23, 2014, now Pat. No. 11,035,249.

(51) Int. Cl.
*B22F 3/00* (2021.01)
*B05B 12/20* (2018.01)
(Continued)

(52) U.S. Cl.
CPC .............. *F01D 25/14* (2013.01); *B05B 12/20* (2018.02); *B05D 3/12* (2013.01); *B22F 3/004* (2013.01);
(Continued)

(58) Field of Classification Search
CPC .... F01D 25/14; B22F 2005/103; B22F 3/225; B22F 3/24; B22F 5/009
See application file for complete search history.

(56) References Cited

U.S. PATENT DOCUMENTS 3,499,066 A * 3/1970 Murray .................... B22F 7/08 425/405.2
5,985,122 A 11/1999 Conner
(Continued)

FOREIGN PATENT DOCUMENTS

JP H1026003 * 1/1998

OTHER PUBLICATIONS

Goncalves, A.C. "Metallic powder injection molding using low pressure." 2001. Journal of materials processing technology. 118. p. 193-198. (Year: 2001).*

*Primary Examiner* — Nicholas A Wang
(74) *Attorney, Agent, or Firm* — NORTON ROSE FULBRIGHT CANADA LLP

(57) ABSTRACT

A method of manufacturing a shroud segment for gas turbine engine includes providing an insert having a plurality of pins that extend into a platform cavity portion of a mold cavity. A powder injection molding feedstock is injected. When the green part is disengaged from the mold, each elongated feature is slid out of the green part to define a respective elongated cooling passage in the platform. The method may include, after debinding and sintering, projecting a coating material while defining an obstruction between source of coating material and the open end of each elongated feature with a shoulder of the element to prevent the coating material from reaching the open end, followed by machining to remove at least a part of the shoulder.

20 Claims, 5 Drawing Sheets

(51) Int. Cl.

| | |
|---|---|
| ***B05D 3/12*** | (2006.01) |
| ***B22F 3/12*** | (2006.01) |
| ***B22F 3/22*** | (2006.01) |
| ***B22F 3/24*** | (2006.01) |
| ***B22F 3/26*** | (2006.01) |
| ***B22F 5/00*** | (2006.01) |
| ***F01D 25/14*** | (2006.01) |
| *B22F 5/10* | (2006.01) |

(52) U.S. Cl.

CPC ................ *B22F 3/12* (2013.01); *B22F 3/225* (2013.01); *B22F 3/24* (2013.01); *B22F 3/26* (2013.01); *B22F 5/009* (2013.01); *B22F 2003/247* (2013.01); *B22F 2005/103* (2013.01); *B22F 2999/00* (2013.01); *F05D 2230/21* (2013.01); *F05D 2230/22* (2013.01); *F05D 2230/90* (2013.01); *F05D 2240/11* (2013.01)

(56) References Cited

U.S. PATENT DOCUMENTS

| | | | | |
|---|---|---|---|---|
| 6,258,226 | B1 | 7/2001 | Conner | |
| 7,510,375 | B2 * | 3/2009 | Toppen .................. | C25D 5/022<br>416/247 R |
| 7,939,135 | B2 | 5/2011 | Toppen et al. | |
| 11,035,249 | B2 * | 6/2021 | Campomanes ......... | B22F 3/004 |
| 2003/0075013 | A1 | 4/2003 | Grohowski | |
| 2009/0104356 | A1 | 4/2009 | Toppen et al. | |
| 2011/0182720 | A1 | 7/2011 | Kojima et al. | |
| 2013/0051979 | A1 * | 2/2013 | Durocher .................. | F01D 9/04<br>415/115 |
| 2013/0051989 | A1 * | 2/2013 | Durocher ................ | B22F 3/225<br>415/168.1 |
| 2013/0052007 | A1 * | 2/2013 | Durocher ................ | B22F 3/225<br>415/213.1 |
| 2013/0052074 | A1 | 2/2013 | Durocher et al. | |

* cited by examiner

METHOD OF MANUFACTURING GAS TURBINE ENGINE ELEMENT HAVING AT LEAST ONE ELONGATED OPENING

CROSS-REFERENCE TO RELATED APPLICATIONS

The present application is a divisional of U.S. patent application Ser. No. 14/338,480 filed Jul. 23, 2014, the entire contents of which are incorporated herein by reference.

TECHNICAL FIELD

The disclosure relates generally to the manufacturing of gas turbine engine elements having one or more elongated openings, and more particularly to the manufacturing of shroud segments having elongated cooling passages.

BACKGROUND

Turbine shroud segments are typically designed with many small elongated openings, such as cooling holes and passages and feather seal grooves. Such openings are usually created using electric discharge machining (EDM) operations after the shroud segment is formed. The use of EDM may increase the manufacturing costs and/or be limited by the accessibility of the process with respect to the geometry of the shroud segment. When a coating is applied to the shroud surface to be in contact with the hot gas of the turbine section, it is typically applied prior to EDM machining to ensure the machined features are free of coating.

SUMMARY

There is accordingly provided a method of manufacturing a shroud segment for a gas turbine engine, the method comprising: providing a mold defining a mold cavity having a shape corresponding to the shroud segment, the mold cavity including a platform cavity shaped to define a platform of the shroud segment, the platform cavity having a mold surface corresponding to an inner surface of the platform of the shroud segment; providing an insert extending partly through the platform cavity, the insert including a plurality of elongated pins extending in the platform cavity along and spaced apart from the mold surface; injecting a powder injection molding feedstock into the mold cavity to obtain a green part with a platform portion through which at least part of the elongated pins extend; disengaging the green part from the mold, including sliding the elongated pins out of the platform portion of the green part to define a plurality of elongated cooling passages in the platform of the shroud segment, the elongated cooling passages disposed radially between inner and outer surfaces of the platform portion; and debinding and sintering the green part to define the shroud segment.

There is also provided a method of manufacturing a shroud segment for a gas turbine engine, the method comprising: forming a shroud segment with a platform having an outer portion in which a plurality of cooling passages are defined, each of the cooling passages having an open end formed in an end surface of the outer portion of the platform, and an inner portion defining an inner surface of the shroud segment, the inner portion including a shoulder protruding beyond the end surface adjacent the outer portion; applying a coating material on the inner surface from a source, the coating material being applied while providing an obstruction between the source and the open end with the shoulder to prevent the coating material from reaching the open end of each of the cooling passages; and after the coating is applied, machining the inner portion to remove at least a part of the shoulder.

In another aspect, there is provided a method of manufacturing a cooled shroud segment for a gas turbine engine, the method comprising: providing a mold defining a mold cavity having a shape corresponding to the shroud segment, the mold cavity including a platform cavity shaped to define a platform of the shroud segment, the platform cavity having a mold surface corresponding to an inner surface of the platform of the shroud segment; providing an insert extending partly through the mold cavity, the insert including a plurality of elongated pins extending in the platform cavity along and spaced apart from the mold surface; injecting a powder injection molding feedstock into the mold cavity to obtain a green part through which at least part of the elongated pins extend; disengaging the green part from the mold, including sliding the elongated pins out of the green part to define a plurality of elongated cooling passages in the platform of the shroud segment; and debinding and sintering the green part to define the shroud segment.

In another aspect, there is provided a method of manufacturing a gas turbine engine element, the method comprising: providing a mold including a mold cavity and an insert extending partly through the mold cavity, the insert having at least one elongated feature received in the mold cavity, each elongated feature having a length L and a cross-sectional dimension S defined along a direction extending perpendicularly to the length, and each elongated feature having one or both of: the cross-sectional dimension S being 0.020 inches or less, and a ratio US between the length and the cross-sectional dimension of at least 25; injecting a powder injection molding feedstock into the mold cavity without permanently deforming the at least one elongated feature to obtain a green part through which at least part of each elongated feature extends; disengaging the green part from the mold, including sliding each elongated feature out of the green part along the length of the elongated feature to define a respective elongated opening in the green part; and debinding and sintering the green part to define the gas turbine engine element.

In a further aspect, there is provided a method of manufacturing a gas turbine engine shroud segment, the method comprising: forming a shroud segment with a platform having an outer portion in which a plurality of cooling passages are defined, each cooling passage having an open end formed in an end surface of the outer portion, and an inner portion defining an inner surface of the shroud segment, the inner portion including a shoulder protruding beyond the end surface adjacent the outer portion; projecting a coating material on the inner surface from a source, the coating material being projected while defining an obstruction between the source and each open end with the shoulder to prevent the coating material from reaching each open end; and after the coating is applied, machining the inner portion to remove at least a part of the shoulder.

BRIEF DESCRIPTION OF THE DRAWINGS

Reference is now made to the accompanying figures in which.

DETAILED DESCRIPTION

Figure 1:
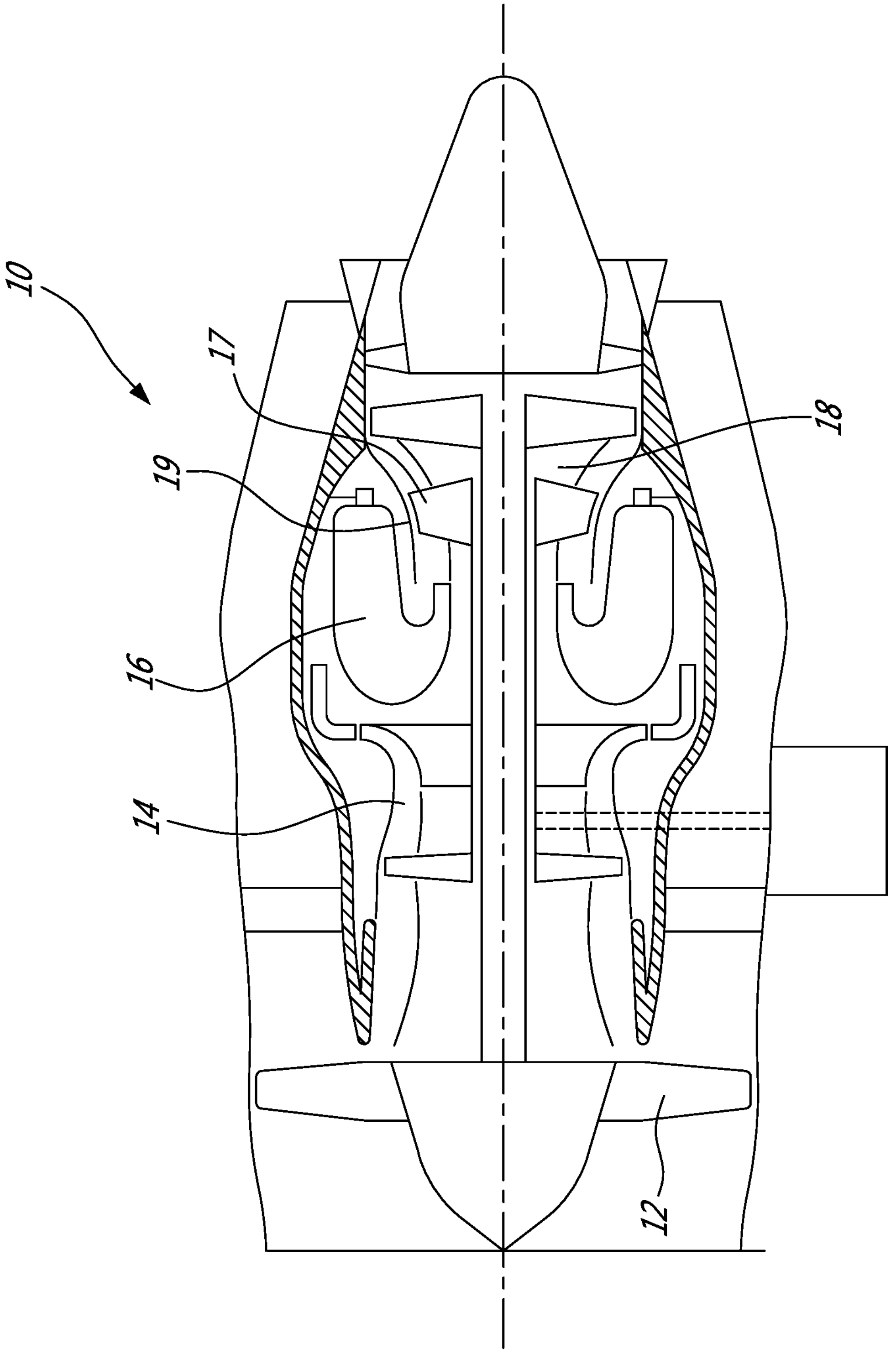
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The turbine section 18 generally comprises one or more stages of rotor blades 17 extending radially outwardly from respective rotor disks, with the blade tips being disposed closely adjacent to an annular turbine shroud 19 supported from the engine casing. The turbine shroud 19 is segmented in the circumferential direction and accordingly includes a plurality of shroud segments disposed circumferentially one adjacent to another.

Figure 2:
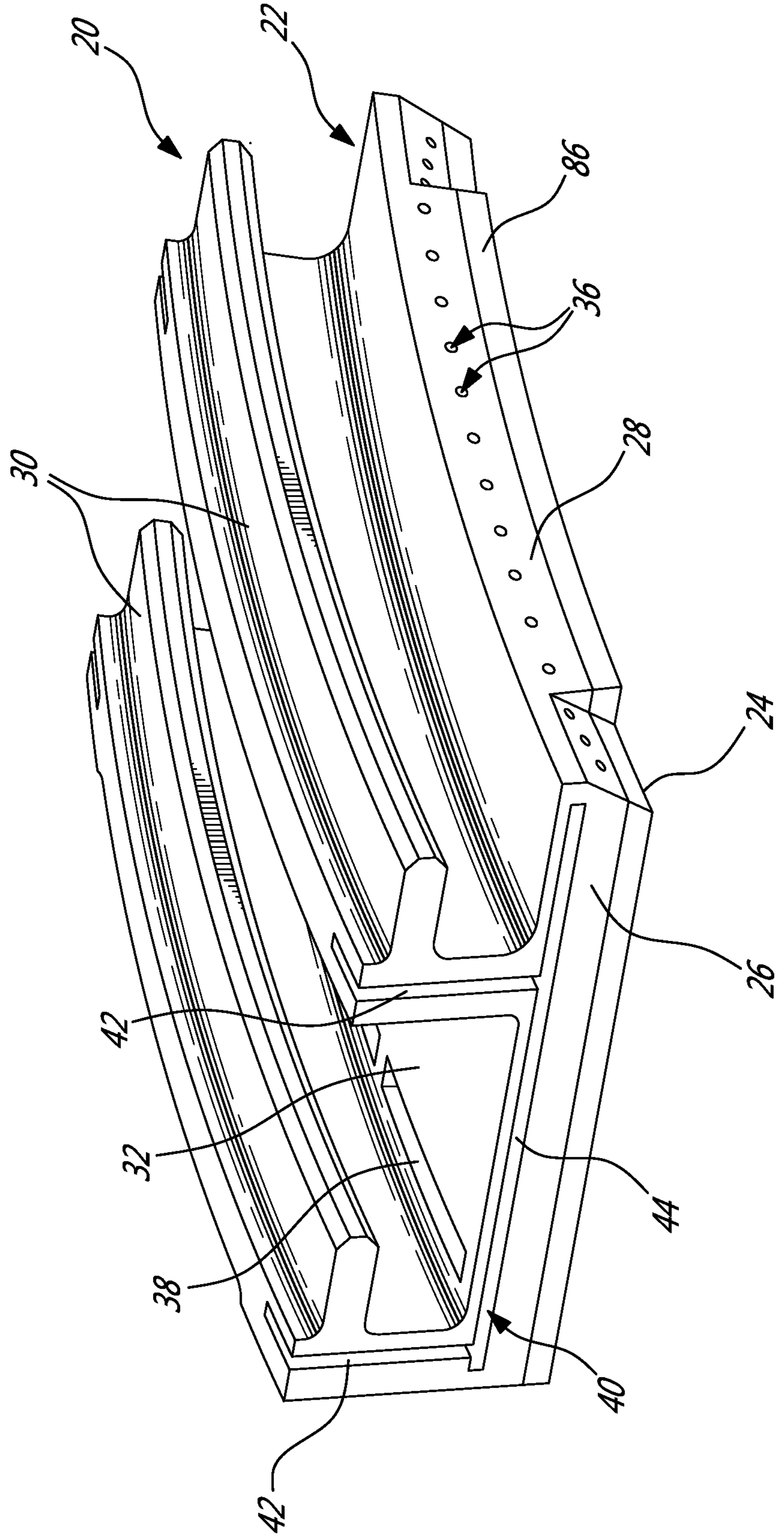
FIG. 2 is a schematic tridimensional view of a shroud segment in accordance with a particular embodiment, which may be used in a gas turbine engine such as shown in FIG. 1.

Referring to FIG. 2, an example of one such turbine shroud segments 20 is schematically shown. The body of the shroud segment 20 generally includes an arcuate platform 22 extending circumferentially between two side surfaces 26 (only one of which being visible in FIG. 2) and axially between two end surfaces 28 (only one of which being visible in FIG. 2). The platform 22 defines an inner or hot surface 24 adapted to be disposed adjacent to the tip of the turbine blades 17 and coming into contact with the hot combustion gases travelling through the turbine section 18. The body of the shroud segment 20 also includes two axially spaced apart retention elements 30 extending radially outwardly from the platform 22 for engagement with an adjacent structure of the engine 10 to retain the shroud segment 20 in place. In the embodiment shown, the retention elements 30 are defined as hook structures having an L-shaped cross-section, but alternate shapes are also possible. Between the retention elements 30, the platform defines a cold or outer surface 32 opposed to the inner surface 24.

In use, cooling air from an adjacent cavity of the engine 10 in fluid communication with the compressor section 14 is directed on the outer surface 32. The platform 22 is formed such as to allow circulation of the cooling air therethrough. The platform 22 includes a plurality of elongated internal cooling passages 36 defined in proximity of the inner surface 24, which in the embodiment shown are defined as a plurality of parallel passages having an open end formed in one of the end surfaces 28. The platform 22 defines a fluid communication between the outer surface 32 and the cooling passages 36 such that the cooling air directed on the outer surface 32 is circulated through the cooling passages 36. In the particular embodiment shown, such fluid communication is provided through one or more rectangular fluid passage(s) 38 extending along a circumferential direction of the outer surface 32 to communicate with the cooling passages 36. Other configurations are also possible, including, but not limited to, a plurality of cooling holes defined through the outer surface 32 in communication with the cooling passages 36, one or more recess(es) defined in the outer surface 32 in communication with the cooling passages 36, one or more internal plenum(s) defined in the platform 22 in communication with opening(s) through the outer surface 32 and with the cooling passages 36, and combinations thereof.

It is desirable to provide adequate seals between adjacent shroud segments to prevent the cooling air directed on the outer surface 32 from leaking into the engine gas path. A seal groove 40 is defined in each side surfaces 26, sized and configured to receive a feather seal (not shown) extending for sealing engagement in the seal grooves 40 of adjacent shroud segments 20. In a particular embodiment, the feather seal may be made of sheet metal, for example, any appropriate type of nickel or cobalt alloy. The seal groove 40 has a complementary configuration to that of the associated feather seal to provide for proper inter-segment sealing. In the embodiment shown, the seal groove 40 has two radially extending groove portions 42 each provided in a respective one of the retention elements 30, and an axially extending groove portion 44 provided in the platform 22, in communication with the radially extending groove portions 42. It is however understood that the seal groove 40 and associated feather seal can adopt any suitable configurations, including, but not limited to, the seal groove 40 being provided only in the platform 22 or in the retention elements 30, the axially extending groove portion 44 extending only or substantially only between the radially extending groove portions 42, or separate (i.e. non-communicating and receiving distinct seal elements) axially extending groove portion 44 and radially extending groove portions 42.

Figure 3A:
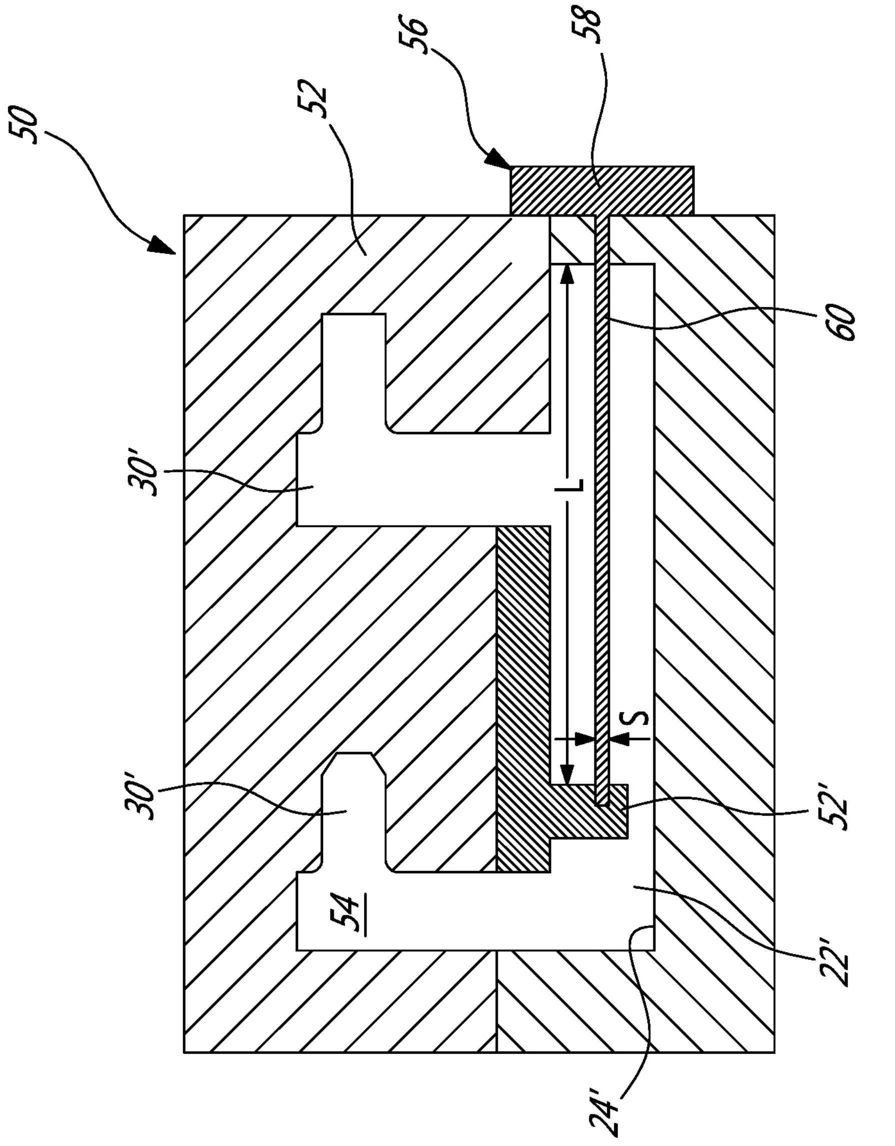
FIG. 3*a* is a schematic cross-sectional view of a mold in accordance with a particular embodiment, which may be used to mold a shroud segment such as shown in FIG. 2.

The manufacturing process of an exemplary turbine shroud segment 20 may be described as follows. Referring to FIG. 3*a*, a mold 50 is provided, having a plurality of mold elements 52 adapted to be assembled together to define a mold cavity 54 having a shape corresponding to the shape of the desired shroud segment 20. It is noted that the mold cavity 54 is larger than that of the desired finished part to account for the shrinkage that occurs during debinding and sintering of the green shroud segment 20. The mold elements 52 are configured such that the mold cavity 54 includes a platform cavity 22' shaped to define the platform 22 and retention element cavities 30' shaped to define the retention elements 30, with the platform cavity 22' including a mold surface 24' corresponding to the inner surface 24 of the shroud segment 20. It is understood that the number and configuration of the mold elements 52 may vary, as long as they create the desired shape for the mold cavity 54 and can be disassembled for removal of the shroud segment 20 without damaging it.

Figure 3B:
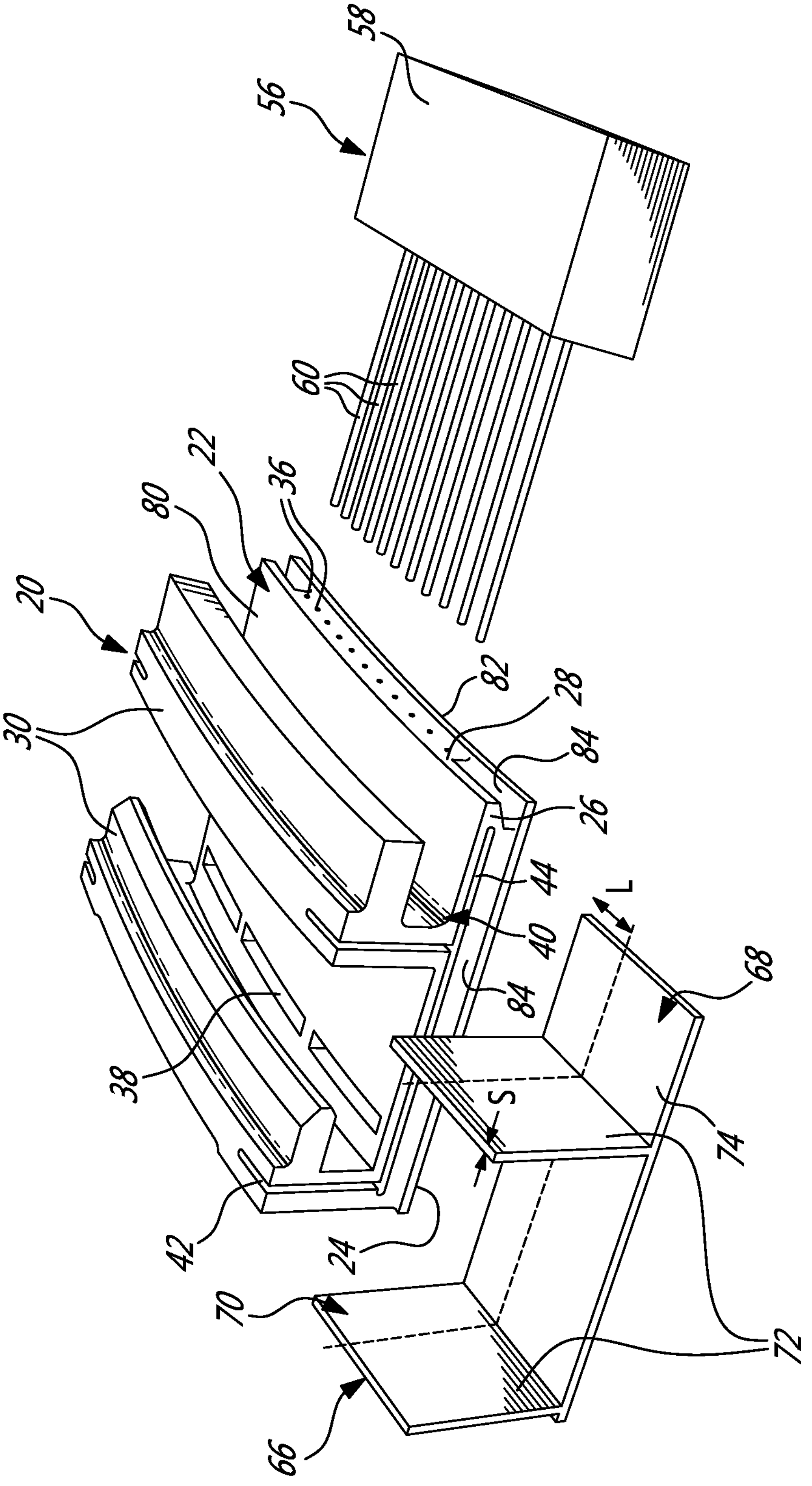
FIG. 3*b* is a schematic exploded tridimensional view of a molded shroud segment formed with the mold of FIG. 3*a* and of two inserts of the mold.

Referring to FIGS. 3*a*-3*b*, the mold 50 also includes a first insert 56 for defining the cooling passages 36, which includes a base 58 and a plurality of elongated pins 60 extending from the base. The elongated pins 60 are at least partially received in the mold cavity 54 across the platform cavity 22' along and spaced apart from the mold surface 24', to each define one of the cooling passages 36. In a particular embodiment, the elongated pins 60 extend in proximity of the mold surface 24'; in a particular embodiment, a distance between the mold surface 24' and each elongated pin 60 is constant along the length of the pin 60. A portion of the insert 56 remains outside of the mold cavity 54 during the molding process, such that the insert 56 is removable from the molded shroud segment 20. In the embodiment shown, the pins 60 extend through one of the mold elements 52, such that the base 58 as well as an adjacent outer part of the pins 60 are located outside the mold cavity 54 to define the outer portion. In another embodiment, the pins 60 are completely received in the mold cavity 54. Other configurations are also possible.

Referring to FIG. 3*b*, the mold also includes a second insert 66 for defining the seal groove 40, having an inner portion 70 extending within the mold cavity 54 for protruding through the side surface 26. The second insert 66 may be formed for example of sheet metal, and has a configuration corresponding to that of the desired seal groove 40; accordingly, in the embodiment shown, the second insert 66 includes two radially extending elements 72 each located in a respective one of the retention element cavities 30' to define the radially extending groove portions 42, and an axially extending element 74 connected to the radially extending elements 72 and located in the platform cavity 22' to define the axially extending groove portion 44. An outer portion 68 of the second insert 66 also remains out of the mold cavity 54 such that the second insert 66 is removable from the molded shroud segment 20.

The shroud segment 20 is manufactured by powder injection molding. A suitable feedstock is thus injected into the mold cavity 54, the feedstock being a homogeneous mixture of an injection powder (metal e.g. cobalt alloy or nickel-based super alloy; ceramic; glass; carbide; composite) with a binder. Other material powders which may include one material or a mix of materials could be used as well. The feedstock is a mixture of the material powder and of a binder which may include one or more binding material(s). In a particular embodiment, the binder includes an organic material which is molten above room temperature (20° C.) but solid or substantially solid at room temperature. The binder may include various components such as surfactants which are known to assist the injection of the feedstock into mold for production of the green part. In a particular embodiment, the binder includes a mixture of binding materials, for example including a lower melting temperature polymer, such as a polymer having a melting temperature below 100° C. (e.g. paraffin wax, polyethylene glycol, microcrystalline wax) and a higher melting temperature polymer or polymers, such as a polymer or polymers having a melting temperature above 100° C. (e.g. polypropylene, polyethylene, polystyrene, polyvinyl chloride). “Green state” or “green part” as discussed herein refers to a molded part produced by the solidified binder that holds the injection powder together.

In a particular embodiment, the powder material is mixed with the molten binder and the suspension of injection powder and binder is injected into the mold cavity 54 and cooled to a temperature below that of the melting point of the binder. Alternately, the feedstock is in particulate form and is injected into the mold cavity 54 of the heated mold 50 where the binder melts, and the mold 50 is then cooled until the binder solidifies.

With the inserts 56, 66 in position, the powder injection molding feedstock is thus injected into the mold cavity 54 to obtain a green part containing at least a portion of the elongated pins 60 of the first insert 56 and the inner portion 70 of the second insert 66, with the base 58 of the first insert 56 and the outer portion 68 of the second insert 66 extending outside of the green part. By using a low injection pressure, the features of the inserts 56, 66 received in the green part may be relatively thin and/or long without being damaged during the injection process. In a particular embodiment, the injection pressure is 100 psi or less; in another particular embodiment, 90 psi or less; in another particular embodiment, 30 psi or less; in another particular embodiment, in a range of from 10 psi to 30 psi; and in another particular embodiment in a range of from 5 psi to 30 psi. Accordingly, in a particular embodiment, thin, long openings (passages, grooves, slots, holes, etc.) which previously had to be machined (e.g. using EDM) after molding may be integrated into the part during molding. In a particular embodiment, a smaller injection pressure allows for thinner and/or longer openings to be molded.

As shown in FIG. 3*a*, the elongated pins 60 each have a length L and a cross-sectional dimension or thickness S defined along a direction extending perpendicularly to the length L. In a particular embodiment, the pins 60 have a circular cross-section and accordingly, the cross-sectional dimension S corresponds to the maximal cross-sectional dimension or diameter. Other cross-sectional shapes are also possible, including but not limited to, various polygonal shapes, and a helical configuration; helical pins are preferably freely rotatable about their axis to facilitate removal from the green part.

In a particular embodiment, the pins 60 are relatively thin, for example with a smaller cross-sectional dimension S than could be used with high pressure injection molding without permanent deformation of the pin during injection. In a particular embodiment, the pins 60 have a cross-sectional dimension S of 0.020 inches or less. In another particular embodiment, the cross-sectional dimension S is from 0.010 inch to inch. In a particular embodiment, the cross-sectional dimension S is about 0.017 inch.

In a particular embodiment, the pins 60 are relatively long, for example with a larger length L that could be used with high pressure injection molding without permanent deformation of the pin during injection. In a particular embodiment, the ratio US between the largest dimension L and the cross-sectional dimension S is at least 25. In another particular embodiment, the ratio US between the largest dimension L and the cross-sectional dimension S is at least 50.

In a particular embodiment, the pins 60 are relatively thin and relatively long, such that a small cross-sectional dimension S is combined with a large ratio US. Examples of pin dimensions include a cross-sectional dimension S of 0.020 inches or less with a ratio L/S of at least 50; and a cross-sectional dimension S of about 0.020 inches with a ratio L/S of about 25.

In the embodiment shown in FIG. 3*a*, the elongated pins 60 are connected at one end to the base 58, and supported as the other end by one of the mold elements 52', for example by each being slidingly received in a corresponding hole defined in this mold element 52'. With the pins 60 thus supported, a higher ratio US can be used for a same injection pressure than for pins 60 being supported only at one end. Examples of dimensions for pins 60 supported at both ends include a cross-sectional dimension S of about 0.020 inch with a ratio L/S of at least 62.5; a cross-sectional dimension S of about inch with a ratio US of at least 100; a cross-sectional dimension S of about 0.020 inch with a ratio L/S of at least 150; a cross-sectional dimension S of about 0.019 inch and a ratio L/S of at least 65. Other dimensions are also possible.

Referring to FIG. 3*b*, the second insert 66 typically has a cross-sectional dimension or thickness S which is larger than the cross-sectional dimension S of the first insert pins 60, for example a thickness of 0.025 inch. The length L of the inner portion 70 is defined in the direction along which the second insert 66 is slid out of engagement with the molded green part; in a particular embodiment, the ratio US is at least 4.

However, the inner portion 70 of the second insert 66 may have similar cross-sectional dimensions S and or ratios US as those discussed for the elongated pins 60.

In a particular embodiment, the viscosity of the feedstock is selected such as to avoid any deformation of the portions of the inserts 56, 66 received in the mold cavity 54. In another particular embodiment, the viscosity of the feedstock is selected such as to avoid permanent deformation, including breaking, of the portions of the inserts 56, 66 received in the mold cavity 54 while allowing elastic deformation; the elongated pins 60 may elastically deform upon injection, but the viscosity of the feedstock remains low enough for a sufficient period of time to allow the elongated pins 60 to regain their initial shape before the binder solidifies. The viscosity of the feedstock is sufficient such that once solidified, the green part maintains its shape. The low viscosity feedstock allows for small injection pressures which allow for the thin, elongated openings to be molded. In a particular embodiment, the viscosity of the feedstock being injected is 100 Pas or less.

Once the feedstock injected into the mold cavity 54 has solidified, the green part disengaged from the mold 50. This includes sliding the elongated pins 60 of the first insert 56 and the inner portion 70 of the second insert 66 embedded in the green part out of engagement with the green part along the direction of their respective length L, thus defining the elongated cooling passages 36 and the seal groove 40 in the shroud segment 20. In the embodiment shown, the mold 50 and first insert 56 are configured such that the elongated pins 60 are slid out of engagement with the green part before the mold elements 52 are separated and the green part is removed from the mold cavity 54. In an alternate embodiment, the mold 50 and first insert 56 are configured such that the mold elements 52 may be separated and the engaged green part and insert 56 may be removed from the mold cavity 54 before the elongated pins are slid out of engagement with the green part.

In a particular embodiment, the inserts 56, 66 are made of the same material as the other mold elements 52, for example hardened steel; alternately, different materials may be used, including, but not limited to, suitable plastics, spring steel, and shape memory alloys.

Although the elongated pins 60 have been shown with a straight (linear) configuration, other configurations are possible with the use of flexible materials in the pins 60. For example, the elongated pins 60 could have a wave shape, and be made of a material flexible enough to be slid out of the green part without damaging the wave-shaped elongated cooling passages formed thereby. Other configurations are also possible.

In a particular embodiment, the inserts 56, 66 are cleaned after removal from the green part to be re-used in the molding of another similar shroud segment.

It is understood that in another embodiment, only the first insert 56 or the second insert 66 may be provided, such as to define only the cooling passages 36 or the seal groove 40 during the molding process.

Once the inserts 56, 66 are disengaged from the green shroud segment 20, it is submitted to a debinding operation to remove most or all of the binder. The green part can be debound using various debinding solutions and/or heat treatments known in the art, to obtain a brown shroud segment 20. After the debinding operations, the brown shroud segment 20 is sintered. The sintering operation can be done in an inert gas environment, a reducing atmosphere ($H_2$ for example), or a vacuum environment depending on the composition of material to be obtained. In a particular embodiment, sintering is followed by a heat treatment also defined by the requirements of the material of the finished part. In some cases, it may be followed with hot isostatic pressing (HIP). Coining may also be performed to further refine the profile of the part. It is understood that the parameters of the sintering operation can vary depending on the composition of the feedstock, on the method of debinding and on the configuration of the part.

In a particular embodiment and with reference to FIG. 3*b*, the shroud segment 20 is molded such as to provide protection to the open ends of the cooling passages 36 and/or seal grooves 40 against clogging during application of a coating on the inner surface 24, for example an oxidation resistant coating. The mold cavity 54 is configured such that the platform 22 is formed with an outer portion 80 defining the surface(s) 26, 28 of the shroud segment 20 in which the open end of each the elongated cooling passages 36 and/or of the seal groove 40 is defined, and with an inner portion 82 defining a shoulder 84 protruding from these surfaces(s) 26, 28 adjacent the outer portion 80. In the embodiment shown, the shoulder 84 thus protrudes from the axially extending side surface 26 in which the open end of the seal groove 40 is defined, and from the circumferentially extending end surface 28 in which the open ends of the cooling passages 36 are defined. The inner portion 82 defines the inner surface 24 of the shroud segment 20 opposite the outer portion 80 and the shoulder 84. The inner portion 82 is thus molded such as to be bigger than the desired final shape of the shroud segment 20, through the addition of the shoulder 84.

Figure 4:
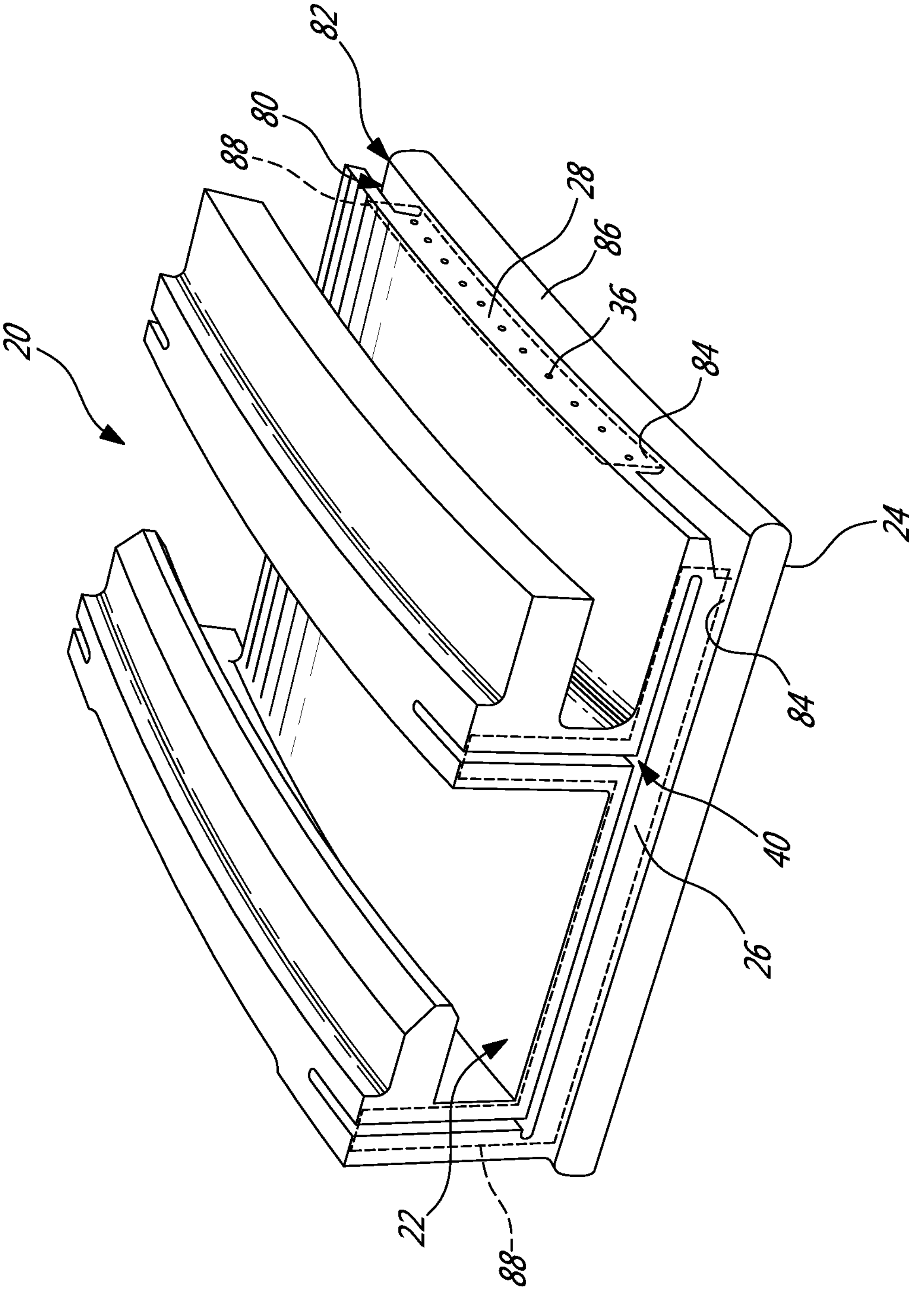
FIG. 4 is a schematic tridimensional view of the shroud segment of FIG. 3*b* after application of a coating on an inner surface thereof, in accordance with a particular embodiment.

Once the shroud segment 20 is sintered, a coating material is projected on the inner surface 24, for example by high velocity oxy-fuel coating spraying (HVOF) or plasma spray, to form a coating layer 86 on the inner surface 24, as shown in FIG. 4. The shoulder 84 defines an obstruction between the source of the coating material and the open ends of the cooling passages 36 and/or seal groove 40, such as to prevent the coating material from reaching these open ends. In a particular embodiment, a mask 88 (see FIG. 4) may be applied on the side surface 26 and/or the end surface 28 over each open end defined therein before projecting the coating material on the inner surface 24. The shoulder 84 is sized such as to protrude beyond the mask 88.

After the coating layer 86 is formed, the inner portion 82 is machined to remove at least a part of, and in a particular embodiment all of, the shoulder 84, at the same time as excess coating is removed from the edges of the shroud segment 20. In a particular embodiment, the side and end surfaces 26, 28 of the outer platform portion 80 are machined at the same time such as to remove any visible delimitation between the two platform portions 80, 82 to define a unitary platform 22, such as shown in FIG. 2.

Although the method has been described with respect to a shroud segment, it is understood that it may be applied to any other element having any type of elongated openings (passages, grooves, slots, holes, etc.) defined therein through the use of one or more inserts having correspondingly shaped elongated feature(s) and/or shoulder(s) adjacent the openings to protect from coating. Examples of such elements include, but are not limited to, vane segments, vane rings, heat shields and other combustor elements, fuel nozzle portions, any other gas turbine engine element with small cooling holes defined therein or therethrough, etc.

Although the method has been described with respect to an element molded as a single part, it is understood that the element may alternately be molded as two or more separate parts, and these parts may be assembled in their green state, connected using any type of suitable non-detachable connections or detachable connections, and debound and sintered to fuse them together to form the final element. In a particular embodiment, the parts are fused during the debinding step, prior to the sintering step, when they are still in the green state. The insert(s) and/or protective shoulder(s) may be used for only one of the parts, some of the parts, or all of the parts.

The above description is meant to be exemplary only, and one skilled in the art will recognize that changes may be made to the embodiments described without departing from the scope of the invention disclosed. Other modifications than those described which fall within the scope of the present invention will be apparent to those skilled in the art, in light of a review of this disclosure, and such modifications are intended to fall within the appended claims.

The invention claimed is:

1. A method of manufacturing a shroud segment for an aircraft engine, the method comprising:

providing a mold defining a mold cavity having a shape corresponding to the shroud segment, the mold cavity including a platform cavity shaped to define a platform of the shroud segment, the platform cavity having a mold surface corresponding to an inner surface of the platform of the shroud segment;

providing an insert extending partly through the platform cavity, the insert including a plurality of elongated pins extending in the platform cavity along and spaced apart from the mold surface;

injecting a powder injection molding feedstock into the mold cavity to obtain a green part with a platform portion through which at least part of the elongated pins extend;

disengaging the green part from the mold, including sliding the elongated pins out of the platform portion of the green part to define a plurality of elongated cooling passages in the platform of the shroud segment, the elongated cooling passages disposed radially between inner and outer surfaces of the platform portion;

debinding and sintering the green part to define the shroud segment; and projecting a coating material on the inner surface of the platform of the shroud segment from a source, the coating material being projected while providing an obstruction between the source and open ends of the elongated cooling passages to prevent the coating material from reaching the open ends of the elongated cooling passages.

2. The method as defined in claim 1, wherein:

the insert is a first insert, and providing the mold includes providing a second insert formed of sheet material extending partially in a side of the platform cavity;

injecting the powder injection molding feedstock is performed to obtained the green part also containing a portion of the second insert; and disengaging the green part from the mold includes sliding the portion of the second insert out of the green part to define a feather seal groove in the shroud segment.

3. The method as defined in claim 1, wherein the elongated pins are provided with a length L and a cross-sectional dimension S, and a ratio of US is at least 50.

4. The method as defined in claim 3, wherein the elongated pins are provided with the cross-sectional dimension S of 0.020 inch or less.

5. The method as defined in claim 1, wherein the elongated pins are straight and have a circular cross-section.

6. The method as defined in claim 1, wherein the powder injection molding feedstock is injected at a pressure of at most 30 psi.

7. The method as defined in claim 1, wherein the powder injection molding feedstock is injected at a viscosity of 100 Pas or less.

8. The method as defined in claim 1, wherein the insert has an outer portion extending out of the mold cavity, and wherein the insert is provided with the elongated pins each having one end connected to the outer portion and an opposed end engaged to and supported by an element of the mold.

9. The method as defined in claim 1, wherein the insert is provided such that a distance between the mold surface and each of the elongated pins is constant along a length of the elongated pin.

10. The method as defined in claim 1, wherein injecting the powder injection molding feedstock includes:

forming an outer portion of the platform with a portion surface in which an open end of the elongated cooling passages is defined, and forming an inner portion of the platform defining a shoulder protruding from the portion surface adjacent the outer portion, the inner portion defining an inner surface of the shroud segment opposite the outer portion and the shoulder;

wherein the method further comprises, after the projecting of the coating material:

machining the inner portion to remove at least a part of the shoulder.

11. The method as defined in claim 1, wherein the green part includes a body defining the platform portion and including retention elements extending radially from the platform portion, the platform portion extending axially between two end surfaces and having a radial thickness defined between an inner surface and an outer surface of the platform portion.

12. The method as defined in claim 11, further comprising forming the elongated cooling passages in the platform of the shroud segment with open ends formed in one of the two end surfaces.

13. The method as defined in claim 1, wherein the elongated cooling passages extend axially through the platform of the shroud segment.

14. A method of manufacturing a shroud segment for a gas turbine engine, the method comprising:

forming a shroud segment with a platform having an outer portion in which a plurality of cooling passages are defined, each of the cooling passages having an open end formed in an end surface of the outer portion of the platform, and an inner portion defining an inner surface of the shroud segment, the inner portion including a shoulder protruding beyond the end surface adjacent the outer portion;

applying a coating material on the inner surface from a source, the coating material being applied while providing an obstruction between the source and the open end with the shoulder to prevent the coating material from reaching the open end of each of the cooling passages; and after the coating is applied, machining the inner portion to remove at least a part of the shoulder.

15. The method as defined in claim 14, further comprising applying a mask on the end surface over each open end before applying the coating, the shoulder protruding beyond the mask.

16. The method as defined in claim 15, further comprising machining the end surface of the outer portion simultaneously with the machining of the inner portion, the inner portion being machined to remove all of the shoulder.

17. The method as defined in claim 14, further comprising forming the cooling passages in the platform by:

providing a mold defining a mold cavity that includes a platform cavity shaped to define the platform of the shroud segment;

providing an insert extending partly through the platform cavity, the insert including a plurality of elongated pins extending in the platform cavity along and spaced apart from a mold surface;

injecting a powder injection molding feedstock into the mold cavity to obtain a green part with a platform portion through which at least part of the elongated pins extend;

disengaging the green part from the mold, including sliding the elongated pins out of the platform portion of the green part to define a plurality of elongated cooling passages in the platform of the shroud segment, the elongated cooling passages disposed radially between inner and outer surfaces of the platform portion; and debinding and sintering the green part to define the shroud segment.

18. The method of claim 17, further comprising injecting the feedstock into the mold cavity at a pressure of at most 30 psi and/or at a viscosity of 100 Pa·s or less.

19. The method of claim 17, further comprising providing the elongated pins with a length L and a cross-sectional dimension S, wherein a ratio of L/S is at least 50.

20. The method of claim 17, wherein the cross-sectional dimension S of the elongated pins are 0.020 inches or less.

* * * * *